Sept. 20, 1971  J. E. BEROSET  3,606,356
HIGH-PRESSURE SEAL ASSEMBLY
Filed Nov. 19, 1968

INVENTOR
J. E. BEROSET
BY MARN & JANGARATHIS
ATTORNEYS

:::

United States Patent Office 3,606,356
Patented Sept. 20, 1971

3,606,356
HIGH-PRESSURE SEAL ASSEMBLY
John Edward Beroset, Alsace Township, Berks County, Pa., assignor to Western Electric Company, Incorporated, New York, N.Y.
Filed Nov. 19, 1968, Ser. No. 777,061
Int. Cl. F16j 15/40
U.S. Cl. 277—165                                 9 Claims

ABSTRACT OF THE DISCLOSURE

This disclosure is directed to a high-pressure seal assembly which is useful for preventing leakage of a high pressure fluid through the interface between a housing and a member extending therethrough, particularly where the housing and member are movable relative to each other, e.g. a piston movable into a pressure vessel for pressurizing fluid contained therein. A high-pressure seal assembly according to the present disclosure may include a high-pressure seal sub-assembly including an annular beveled anti-extrusion ring; and a low-pressure seal sub-assembly including an annular ring of rectangular cross-section, an annular ring of triangular cross-section and a resilient O-ring, all mounted in an annular channel on the high pressure side of the anti-extrusion ring. This disclosure is also directed to an anti-extrusion ring with taper angles which provide improved results with regard to frictional engagement between the anti-extrusion ring and a fluid pressurizing piston, and with regard to tolerance to wear of the anti-extrusion ring.

BACKGROUND OF THE INVENTION

High-pressure seal assemblies of the type used to prevent the leakage of high-pressure fluid from within a pressure vessel, particularly those used to seal the interface between the vessel and a member extending thereinto, one of which is movable relative to the other, ordinarily comprise a low-pressure sealing sub-assembly primarily for providing sealing at low pressure, and a high-pressure sealing sub-assembly primarily for providing sealing at high pressure, so as to provide leak-proof sealing throughout the expected range of pressures to be contained within the vessel.

Known high-pressure seal assemblies have proved generally unsatisfactory, particularly in operational situations wherein frequent cycling between high-pressure load and low-pressure load conditions is experienced, or in situations where the movement between the bodies with respect to which a seal is utilized is extensive and occurs under high-pressure conditions. In the latter situation, for example, it has often been the case that the low-pressure sealing sub-assembly fails in tension during virtually every pressure cycle because of deformation occurring during relative movement between the sealed bodies under high-pressure load, as will be discussed in detail, or because of deformation resulting from cyclic loading during periods of actuation of the seal. In such cases, the low-pressure sealing sub-assembly must be replaced after each pressure cycle.

Further in the typical prior art high-pressure seal assembly, when there has been a compromise decision as to whether to structure various component elements to enhance their operational capabilities under high pressure, or under low pressure or for pre-loading, the decision has generally gone in favor of structuring for performance under high pressure. Such structuring has, in some instances, rendered the component elements of a configuration which renders them difficult, if not virtually impossible, to pre-load.

SUMMARY OF THE INVENTION

Accordingly, it is the object of the present invention to provide a high-pressure seal assembly which includes a high-pressure seal sub-assembly primarily for providing sealing at high pressures, and a low-pressure seal sub-assembly primarily for providing sealing at low pressure, and which low pressure seal sub-assembly does not fail in tension when subjected to high pressure and which is structured so as to permit pre-loading under no-load condition.

Another object of the present invention is the provision of a tapered anti-extrusion ring having a taper angle providing a beneficial compromise between frictional engagement and tolerance to wear.

The foregoing objects are achieved by the high-pressure seal assembly of the present invention for sealing the interface between two members, movable relative to each other, against fluid leakage, and which assembly may include a low-pressure seal sub-assembly which includes a plurality of sealing elements primarily for sealing the interface against fluid leakage at low pressure, such plurality of sealing elements including at least one force transmitting element for transmitting force to others of said sealing elements to pre-load the low pressure seal sub-assembly; and a high pressure seal sub-assembly primarily for sealing the interface against fluid leakage at high pressure.

BRIEF DESCRIPTION OF THE DRAWINGS

A more complete understanding of the present invention may be obtained from a consideration of the following detailed description of the invention when read in the light of the attached drawings wherein.

DETAILED DESCRIPTION

Figure 1A:
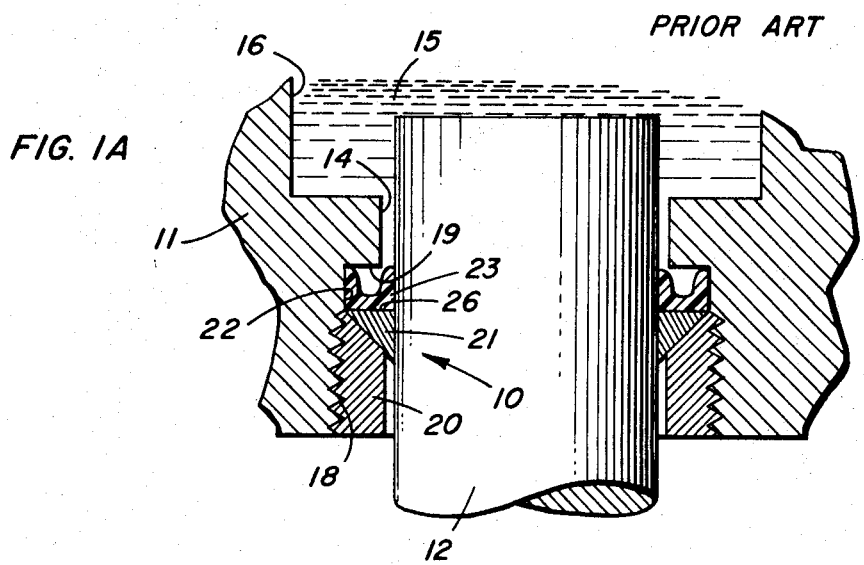
FIG. 1A is a partial cross-sectional view of a typical prior art high-pressure seal assembly for sealing the interface between the piston and pressure vessel shown.

As noted above, high-pressure seal assemblies of the type used to prevent leakage of high-pressure fluid from within a pressure vessel, particularly in operational situations where relative movement between the bodies being sealed is anticipated, ordinarily comprise a low-pressure sealing sub-assembly primarily for providing sealing at low pressure, and a high-pressure sealing sub-assembly primarily for providing sealing at high pressure, so as to provide leak-proof sealing throughout the expected range of pressures to be contained within the vessel. Typical of such prior art high-pressure seal assemblies is the one shown in FIG. 1A, designated generally by the reference numeral 10, for providing a high-pressure seal between a pressure vessel 11 and a piston 12 for compressing a fluid 15 contained within the vessel 11. Pressure vessel 11 is provided with a first bore 14 for reciprocably receiving piston 12 therethrough. The fluid 15 is contained in a fluid-tight chamber defined by a second bore 16 which is in communication with and spaced coaxially inwardly of first bore 14. A threaded counterbore 18, of a greater diameter than first bore 14, is formed coaxially with and outwardly thereof, and cooperates therewith to define a radially extending shoulder 19 against which high-pressure seal assembly 10 is seated when in operating position. The high-pressure seal assembly 10 is retained in operating position by an annular retaining ring 20 which is threadedly engageable with threaded counterbore 18. The inner end of retaining ring 20 is provided with a tapered surface for complementarily seating an annular tapered anti-extrusion ring 21 which defines the high-pressure seal sub-assembly of high-pressure seal assembly 10. The inner surface 26 of anti-extrusion ring 21 cooperates with shoulder 19 and counterbore 18 to define an annular channel 22 in which is mounted a low-pressure sealing sub-assembly comprising an annular ring seal 23 of suitable low friction material such as Teflon (polytetrafluoroethylene). Seal 23 is generally U-shaped in cross-section, the base of which is in abutting engagement with the axially inner surface 26 of anti-extrusion ring 21.

As is known in the prior art, it is desirable to pre-load the ring prior to the initial pressurization of the fluid 15 so that leakage does not occur around piston 12 under no-load, or very low-load conditions. This sealing, under no-load or substantially no-load conditions, is accomplished by a resilient engagement between seal 23 and piston 12; it being understood by those skilled in the art that the expressions "no-load condition," "low-load condition," and "loaded condition," have reference to the pressurization level of the fluid 15 and the effect thereof on the structure. Such resilient engagement of the seal 23 is accomplished by making the U-shaped low friction seal 23 wider than the distance between the surface of bore 18 and the peripheral surface of piston 12 so as to cause the seal to extend into the path of piston 12, and by pre-loading the seal by generating a pre-stress condition in seal 23 by the advance thereagainst of annular retaining ring 20 to cause the seal to extend further into the path of piston 12. Thus, upon advance of the piston 12 into vessel 11, the U-shaped seal is deflected radially outwardly thereby resiliently engaging the piston and forming a seal between piston 11 and vessel 12 for precluding the escape of fluid 15 from chamber 16 upon initial pressurization thereof.

However, it has been found that the U-shaped configuration of the seal 23 does not always permit the establishment of the pre-loading condition to the degree desired. It appears that upon the advancement of the piston 12 and the retaining ring 20, the U-shaped seal 23, after first being deflected radially outwardly as taught above, compresses or collapses inwardly into the open space defining the U-shaped configuration, and thus aborting the desired pre-loading.

As is also known in the prior art, the U-shaped cross-sectional configuration of the ring seal 23 is for the primary purpose of providing a large surface for the pressurized fluid 15 to act against and thereby generate forces for urging the seal into sealing engagement with the piston 11 and the pressure vessel 12, which generated forces are proportional to the pressurization level of the fluid 15. However, it has been found that this presents a further problem upon further advancement of the piston 12 and the increased pressurization of the fluid 15.

Figure 1B:
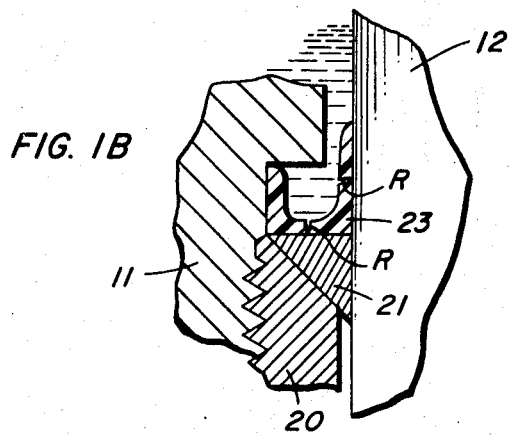
FIG. 1B is an enlarged partial view taken from FIG. 1A and illustrates diagrammatically prior art seal failure problems.

More specifically, it appears that upon continued advancement of piston 12 into vessel 11, such advancement increases the pressure in fluid 15 sufficiently to cause the U-shaped seal 23 to expand both radially outwardly and inwardly against the surface of the counterbore 18, surface 26 of the ring 21, and the outer surface of the piston 12, respectively. The expansion of the U-shaped seal causes an increase in the area of contact between the adjacent surfaces of the U-shaped seal 23 and the piston 12. Further, the increased fluid pressure acting against the U-shaped seal causes an increase in the force with which the seal bears against the surface of piston 12, and therewith an increase in the magnitude of the frictional force generated between the adjacent surfaces of seal 23 and piston 12 when the piston is moved therethrough. Thus, because the pressure acting to cause contact between seal 23 and piston 12 ordinarily increases with continued inward movement of piston 12, and because frictional drag between piston 12 and seal 23 also increases with such increases in pressure, it appears to those skilled in the art that, as illustrated in FIG. 1A, the frictional forces generated usually are of sufficient magnitude, at least in very high-pressure applications (e.g. above 100,000 p.s.i.) to prevent relative sliding movement between the piston 12 and the seal 13 and to cause the leg of the U-shaped ring 23 in such high frictional engagement with the piston 12 to be moved or dragged forward with the piston while, at the same time, the base and other leg of the U-shaped ring 12 are held by the pressurized fluid 15 fast against the ring 21 and the vessel 12, thereby elongating a portion of the seal 23 and placing the seal material in high tensile stress. Such tensile stress can become so great as to cause permanent deformation of the seal 23 so as to destroy the capability of the sealing ring 23 to accomplish its low pressure sealing function for subsequent cycles, and require its replacement prior to subsequent pressure loading of the vessel. Further, as illustrated in FIG. 1B, such tensile stress can become so great as to rupture the seal material with rupture typically occurring at the points indicated by irregular lines R.

It further appears that the above-described tensile failure of sealing ring 23 occurs only when fluid 15 is subjected to very high pressures at which time actual sealing is being accomplished, at least primarily, by the anti-extrusion ring 21 comprising the high-pressure seal sub-assembly. Thus, notwithstanding the failure of sealing ring 23, pressure within vessel 11 is not necessarily lost during a cycle of operation, at least until such pressure is reduced to a level below which anti-extrusion ring 21 is no longer effective as a seal. It is obvious, however, that although pressure is not lost at the time of failure of the sealing ring, the ring must be replaced prior to subsequent pressure cycles. As was noted above, where prior art seals such as U-shaped seal 23 have been used, such replacement has often been required after each operational pressure cycle has been completed.

These and other problems are solved in accordance with the invention by a novel high pressure seal assembly including a high-pressure seal sub-assembly, and a low-pressure seal sub-assembly which can be pre-loaded, which provides efficient sealing at no-load and low load conditions, and which does not fail in tension under later experienced high pressures.

Figure 2:
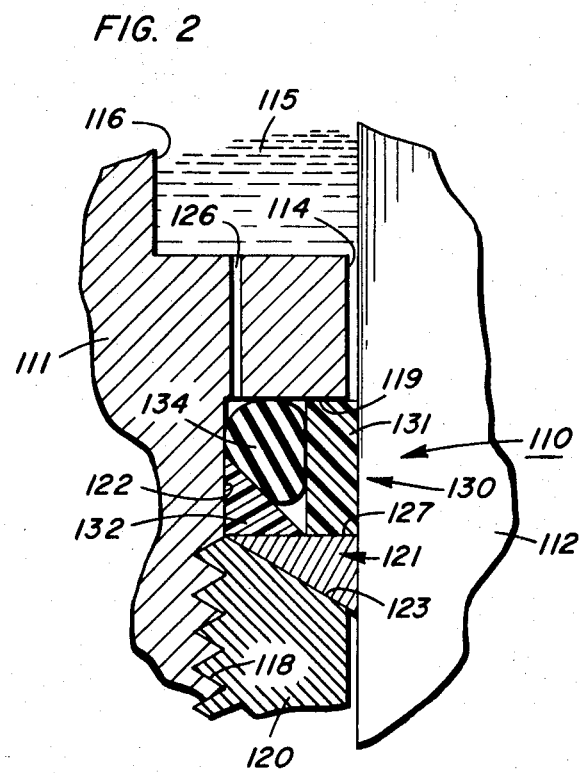
FIG. 2 is a partial cross-sectional view of a high-pressure seal assembly embodying the present invention.

Referring therefore to FIG. 2, a high-pressure seal assembly embodying the present invention designated generally by the reference numeral 110, is shown in position to seal the interface between an opening in a pressure vessel 111 and a piston 112 reciprocably extending therethrough.

The high-pressure seal assembly 110 includes a high-pressure seal sub-assembly 121 primarily for providing sealing at high presure, and a low pressure seal sub-assembly 130 primarily for providing sealing at low pressure. With regard to the expressions "primarily for providing sealing at high pressure, and primarily for providing sealing at low pressure," it will be understood by those skilled in the art that with the instrumentation presently available, it is not possible to determine at precisely what pressure level, or range, the low pressure sub-assembly relinquishes the sealing function to the high pressure sub-assembly during the pressurization cycle; or at what pressure level, or range, the reverse transition occurs during the de-pressurization cycle. It is known, however, that at no-load and at low pressure (e.g. 50,000 p.s.i. and below) it is the low-pressure sub-assembly which solely provides the sealing function. It is also known that at high pressure (pressure for example greatly above the yield strength of the component elements of the low pressure sub-assembly, e.g. 400,000 p.s.i.) it is the high-pressure sub-assembly which solely provides the sealing function. Obviously, even though positive determination is not possible with present instrumentation, at least at some intermediate pressure range, the seal sub-assemblies must cooperatively accomplish the sealing function. Hence, in the context of this specification and the appended claims, the respective seal sub-assemblies will be defined with regard to their primary sealing function.

More specifically, a pressure vessel 111 is provided with a first bore 114 and a second bore 116, the second bore 116 defining a fluid tight chamber for containing a fluid 115. First bore 114 defines an opening in vessel 111 through which piston 112 reciprocates to compress or decompress the fluid 115 contained in the fluid tight chamber defined by bore 116. A threaded counterbore 118, which is of greater diameter than first bore 114, is formed in vessel 111 coaxially with and axially outwardly of first bore 114. Counterbore 118 cooperates with first bore 114 to define a radial shoulder 119 therebetween against which high pressure seal assembly 110 is seated when in operating position. The high pressure seal assembly 110 is positioned in the operating position by an annular retaining ring 120 which is threadedly engageable with threaded counterbore 118. The inner end of retaining ring 120 is provided with a tapered surface for complementarily seating an annular tapered anti-extrusion ring 121 of the type generally known in the art, made for example of beryllium-copper, which ring 121 defines the high-pressure seal sub-assembly of high pressure seal assembly 110. As was the case with respect to the apparatus of FIG. 1, the axially inner surface of anti-extrusion ring 121 cooperates with shoulder 119 and counterbore 118 to define an annular channel 122 for receiving a low pressure seal sub-assembly 130 structured in accordance with the present invention. Further, as can be seen in FIG. 2, annular channel 122 is in fluid communication with the fluid tight chamber defined by second bore 116 through a passage 126 extending through shoulder 119 from channel 122.

It will be understood that the term "interface" is used herein and in the appended claims to define, expositively, the leak paths or path, which may exist between the members to be sealed to prevent fluid leakage; and in the context of the illustrative example of the present invention shown in FIG. 2, the term "interface" describes collectively and severally all leakage paths between the piston 112 and the pressure vessel 111, e.g., the leak path between the piston 112 and the retaining ring 120, and/or the leak path between the pressure vessel bore 118 and the retaining ring 120.

Referring now particularly to the low pressure seal sub-assembly 130 primarily for providing sealing at low pressure, such sub-assembly comprises an annular ring 131 of some resilient low friction material, such as for example Teflon (polytetrafluoroethylene) which ring 131 has a generally rectangular cross-section; an annular ring 132 also of some resilient, low friction material, such as, for example, Teflon, and which ring 132 has a generally triangular cross-section; and an O-ring 134 which is of compressible and resilient material, such as for example Buna-N rubber.

Triangular ring 132 accomplishes two functions, viz it acts to seal the threaded joint between bore 118 and retaining ring 120, and it cooperates with O-ring 134 to impose a radially inwardly directed force against rectangular ring 131 which tends to displace the rectangular ring inwardly against the surface of piston 112 to form a fluid tight seal therewith and seal the space between the piston and the ring 121 and the retaining ring 120. Thus, the low pressure seal sub-assembly of the present invention is structurted to provide pre-loading by providing for the transmission of force through triangular ring 132 and O-ring 134 to pre-stress rectangular ring 131 inwardly so as to cause it to sealingly engage the surface of piston 112 during the no-load, and low load conditions.

More particularly, the force necessary to place the initial sealing pre-stress on rectangular ring 131 is provided by the inward advance of retaining ring 120 in threaded counterbore 118. Thus, as retaining ring 120 is advanced in counterbore 118, it bears upon the anti-extrusion ring 121 which in turn bears against triangular ring 132, both of which are displaced axially inwardly so as to compress resilient O-ring 134. The compressive forces of resilient O-ring 134 are redirected against rectangular ring 131 by the effect of resilient O-ring 134 bearing against the beveled reaction surface of triangular ring 132, and the redirected forces cause the rectangular ring 131 to be pressed into sealing engagement with piston 112. Such sealing engagement precludes the escape of fluid 115 from vessel 111 at no-load and low-load conditions. Additionally, the reactive force of resilient O-ring 134 bearing against the beveled surface of triangular ring 132, also pre-loads ring 132 by urging ring 132 radially outwardly so as to insure that triangular ring 132 is in tight sealing engagement with the peripheral surface of annular channel 122 and anti-extrusion ring 121, thereby precluding the leakage of fluid between retaining ring 120 and bore 118.

Considering now the operation of the high-pressure seal assembly 110, vessel 111 is readied for pressurization by positioning piston 112 partially therein through bore 114 and filling the vessel with sufficient fluid 115 so as to preclude the entrapment of air. Thereafter, the components of low-pressure seal sub-assembly 130 and the anti-extrusion ring 121 are advanced into bore 118 against shoulder 119 by the advancement of retaining ring 120. The advancement of retaining ring 120 is continued until force is exerted against anti-extrusion ring 121, triangular ring 132 and O-ring 134 so that initial sealing pre-stress is placed on rectangular ring 131 in the manner discussed above. At this point the system is ready for the pressurization of fluid 115 by the continued advancement of piston 112 inwardly of vessel 111.

Upon continued advancement of the piston to pressurize the fluid 115 to low pressure, the pressurized fluid is communicated through passage 126 to channel 122 and bears against O-ring 134 which in turn bears against triangular ring 132 and rectangular ring 131. Thus, as the pressure in fluid 115 increases, both seals 131 and 132 are urged more forcefully into their respective sealing positions so as to increase their sealing capability commensurate with the need created by the increased pressure in fluid 115; specifically the ring 131 being forced into sealing engagement with the piston 112 to prevent fluid leakage between the piston and its interface with the pressure vessel (specifically between the piston and the retaining ring 120) and the ring 132 being forced into sealing engagement with the peripheral surface of annular channel 122 and the anti-extrusion ring 121 thereby preventing fluid leakage between retaining ring 120 and bore 118.

Upon still further advancement of the piston to pressurize the fluid to high pressure, fluid pressure is exerted against O-ring 134 and is transmitted to triangular ring 132 through the O-ring, the triangular ring 132 exerts force against the inner surface 127 of anti-extrusion ring 121, thereby displacing or tending to displace, the anti-extrusion ring 121 downwardly against the tapered surface 123 of retaining ring 120. Upon such displacement, or tendency thereto, the tapered surface 123 deflects the anti-extrusion ring radially inwardly into fluid-tight sealing engagement with the piston 112. Further, as the pressure of fluid 115 increases still further to even higher high pressure, it can be seen that anti-extrusion ring 121 is forced into progressively tighter sealing engagement with the surface of piston 112 so as to alone completely preclude all escape of fluid.

As described in detail above, it is during the period at which the fluid 115 is highly pressurized that the typical prior art low-pressure seals have failed in tension. However, at such time, the low-pressure sub-assembly of the present invention has been found to be much less apt to fail in tension. More specifically, it has been found that by making the ring 131 of generally rectangular cross-sectional configuration, it has much greater resistance against tensile failure than the prior art shapes, e.g., the U-shaped prior art seal discussed above. Further, since the sealing rings 131 and 132 are physically distinct, each can be subjected to very high fluid pressure, or have fluid generated forces transmitted thereto by the O-ring 134, sufficiently great to force the rings apart a significant distance without causing ruinous deformation of the rings or any ring tensile failure.

Additionally, at high pressure when the anti-extrusion ring is providing complete sealing, it will be recognized that unlike with the integrally formed U-shaped low-pressure seal of the prior art, the physically distinct rings 131 and 132 of the present invention can allow the pressurized fluid to circulate between the elements of the low-pressure seal assembly and in particular between the rectangular ring 131 and the surface of piston 112, thereby substantially eliminating all frictional contact between the surfaces of the piston and ring 131. Under these circumstances, the low-pressure seal sub-assembly is not in contact with the surface of piston 112 and is not subjected to frictional forces generated by any relative movement of piston 112, which, as discussed above, have heretofore caused tensile failure of the prior art low-pressure sealing elements.

In view of the foregoing detailed description, the low-pressure sealing sub-assembly of the present invention provides a seal which is effective to prevent leakage of fluid from a fluid-tight chamber at no-load and substantially no-load conditions, which is less subject to tensile failure than known prior art low-pressure sealing sub-assemblies, and which is capable of repeated use notwithstanding the cyclic exertion of high pressure fluid forces thereagainst.

Figure 3:
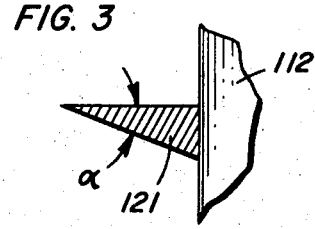
FIG. 3 is a partial cross-sectional view of an anti-extrusion ring according to the present invention.

Referring now to FIG. 3, it has been discovered that by appropriately choosing the taper of the anti-extrusion ring 121, i.e., the angle α of the anti-extrusion as shown in cross-section, adequate sealing can be maintained and a beneficial improvement can be achieved with regard to the amount of frictional engagement between the ring 121 and the piston 112, and the tolerance to wear of the ring due to such frictional engagement; the angle α being referred to hereinafter and in the appended claims as the "taper angle."

In the prior art, the taper angle α has typically been between 45 and 50 degrees. Inquiry has revealed that such taper angles are too large (as measured from the horizontal) and in that they cause undesirably and unnecessarily high frictional engagement between the ring 121 and the piston 112 giving rise to the undesirably poor tolerance to wear. It has been discovered that smaller taper angles provide sufficiently great force of engagement between the ring and piston for satisfactory sealing at high pressure, and yet still provide adequate tolerance to wear.

More particularly, it has been found that with taper angles of from 5 to 10 degrees, adequate sealing is maintained and highly desirable small frictional engagement between the ring 121 and the piston is achieved, however at such taper angles, the ring exhibits undesirably poor tolerance to wear. At taper angles from 25 to 30 degrees, the ring 121 provides desirably greater tolerance to wear, but undesirably high amounts of frictional engagement between the ring and piston are present.

Further investigation has revealed that taper angles from approximately 15 to 20 degrees provide greatly improved results with regard to both the tolerance to wear of the ring and the ring-piston frictional engagement. Accordingly, anti-extrusion rings having taper angles of approximately 15 to 20 degrees have been found to provide an advance in the seal art.

It is manifest that many modifications and changes may be made in the present invention without departing from the spirit and scope thereof.

What is claimed is:

1. A high-pressure seal assembly for sealing a first interface between a piston, advanceable in a pressure vessel for pressurizing fluid to be received therein, and a retaining ring, advanceable into the pressure vessel to apply mechanical force to the high pressure seal assembly; and a second interface between the retaining ring and the pressure vessel; comprising:

(A)
(1) a low-pressure seal sub-assembly including (i) a first ring seal for surrounding said piston and for sealing said first interface between said piston and said retaining ring, (ii) a second ring seal for sealing said second interface between said retaining ring and said pressure vessel, and (iii) an O-ring disposed between said ring seals;
(2) said O-ring for receiving said mechanical force from said retaining ring and for transmitting said force to said ring seals (i) to cause said first ring seal to sealingly engage said piston and seal said first interface at no-load condition, and (ii) to cause said second ring seal to seal said second interface at no-load condition;
(3) said O-ring, upon said fluid being pressurized to low pressure, for receiving force generated by said low pressurized fluid acting thereagainst and for transmitting such fluid generated force to said ring seals (i) to force said first ring seal into increased sealing engagement with said piston to seal said first interface at low pressure, and (ii) to cause said second ring seal to increasingly seal said second interface; and (B)
(1) a high-pressure seal sub-assembly including at least one high-pressure ring element for surrounding said piston;
(2) said O-ring, upon said fluid being pressurized to high pressure, for receiving force generated by said high-pressurized fluid acting thereagainst and for transmitting said fluid generated force to said high-pressure ring element (i) to force said high-pressure ring element into sealing engagement with said piston to seal said first interface at high pressure, and (ii) to cause said high pressure ring element to seal said second interface at high pressure.

2. A high-pressure seal in accordance with claim 1 wherein said first and said second ring seals are of generally rectangular and triangular cross-sectional configuration, respectively, and said ring seals are made of polytetrafluoroethylene.

3. A high-pressure seal in accordance with claim 1 wherein said O-ring is of generally circular cross-sectional configuration and is made of Buna-N rubber.

4. A high-pressure seal in accordance with claim 1 wherein said high-pressure ring element is of generally triangular cross-sectional configuration and is made of beryllium-copper.

5. A high-pressure seal in accordance with claim 4 wherein the taper angle of said high pressure ring element is from approximately 15 to 20 degrees.

6. A high-pressure seal assembly for sealing the interface between two members against the leakage of fluid through the interface, comprising:
(a) means for providing sealing of said interface against fluid leakage primarily upon said fluid being pressurized to low pressure, including (i) a first sealing element in engagement with one of said two members, (ii) a second sealing element in engagement with the other of said two members, and (iii) force transmitting means in engagement with said first and second sealing elements, said force transmitting means for transmitting force to said first and second sealing elements prior to the pressurization of said fluid and upon said fluid being pressurized to low pressure to force said first and second sealing elements in sealing engagement with their respectively engaged members and thereby seal said interface; and (b) means for providing sealing of said interface against fluid leakage primarily upon said fluid pressurized to high pressure, said high-pressure sealing means positioned in said interface on the low pressure side of said low pressure sealing means and in force receiving relationship therewith, said low pressure sealing means for transmitting force to said high pressure sealing means upon said fluid being pressurized to high pressure to cause said high pressure sealing means to seal said interface.

7. A high-pressure seal in accordance with claim 6 wherein said first sealing element comprises a first ring of a generally triangular cross-section, said second sealing element comprises a second ring of a generally rectangular cross-section, and said force transmitting means comprises an O-ring of a generally circular cross-section; and wherein said high-pressure sealing means comprises an anti-extrusion ring of a generally triangular cross-section having a first surface in engagement with said other member and a second surface in engagement with said first and second sealing elements.

8. A high-pressure seal assembly for sealing the interface between a vessel for containing pressurized fluid and a member movable into said vessel, comprising:

(a) means primarily for sealing said interface at low pressure, including (i) a first element in engagement with said vessel, (ii) a second element in engagement with said movable element, and (iii) a third element positioned in force receiving relationship with said fluid and in engagement with the first and second elements, said third element for transmitting preloading force to said first and second elements to cause said first and second elements to seal said interface prior to pressurization of said fluid, and said third element upon said fluid being pressurized to low pressure for transmitting fluid generated force to said first and second elements to cause said first and second elements to seal said interface at low fluid pressure; and (b) means primarily for sealing said interface at high pressure, said high-pressure means including at least one high-pressure element positioned in said interface in contact with said movable member, said first element of said low pressure sealing means also being in engagement with said at least one high pressure element, upon said fluid being pressurized to high-pressure, said first element transmitting said fluid generated force to said at least one high-pressure element to cause said high-pressure element to seal said interface at high fluid pressure.

9. A high-pressure seal assembly in accordance with claim 8 wherein said first element comprises a first ring of a generally triangular cross-section, said second element comprises a second ring of generally rectangular cross-section, said third element comprises an O-ring of generally circular cross-section, said O-ring being in engagement with the hypotenuse surface of said first ring and also in engagement with said second ring; and wherein said one high-pressure element comprises an anti-extrusion ring of a generally triangular cross-section having a first surface in engagement with the movable member and a second surface in engagement with said first and second rings.

References Cited
UNITED STATES PATENTS

| | | | |
|---|---|---|---|
| 2,036,537 | 4/1936 | Otis | 277—188X |
| 3,351,350 | 11/1967 | Shepler | 277—188X |
| 3,381,970 | 5/1968 | Brown | 277—188X |
| 3,394,941 | 7/1968 | Traub | 277—188X |

LAVERNE D. GEIGER, Primary Examiner

R. I. SMITH, Assistant Examiner

U.S. Cl. X.R.

277—188, 190

UNITED STATES PATENT OFFICE
CERTIFICATE OF CORRECTION

Patent No. 3,606,356       Dated September 20, 1971

Inventor(s) J. E. BEROSET

It is certified that error appears in the above-identified patent and that said Letters Patent are hereby corrected as shown below:

Column 5, line 68, "structurted" should read --structured--. Column 9, line 5, "fluid pressurized" should read --fluid being pressurized--.

Signed and sealed this 7th day of March 1972.

(SEAL)
Attest:

EDWARD M. FLETCHER, JR.
Attesting Officer

ROBERT GOTTSCHALK
Commissioner of Patents